No. 725,406. PATENTED APR. 14, 1903.
C. CAMPBELL.
UNLOADING APPARATUS.
APPLICATION FILED DEC. 19, 1902.
NO MODEL.
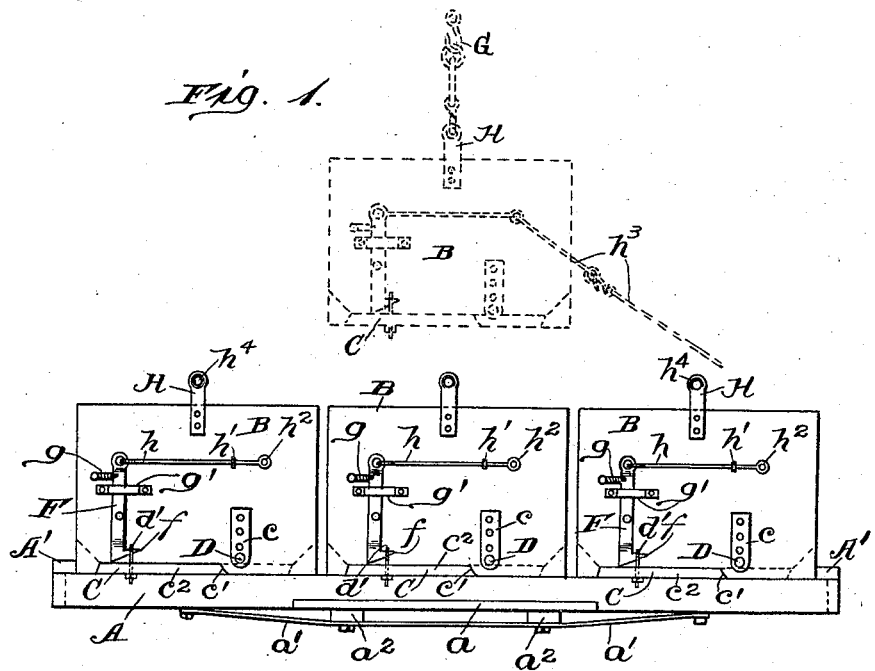
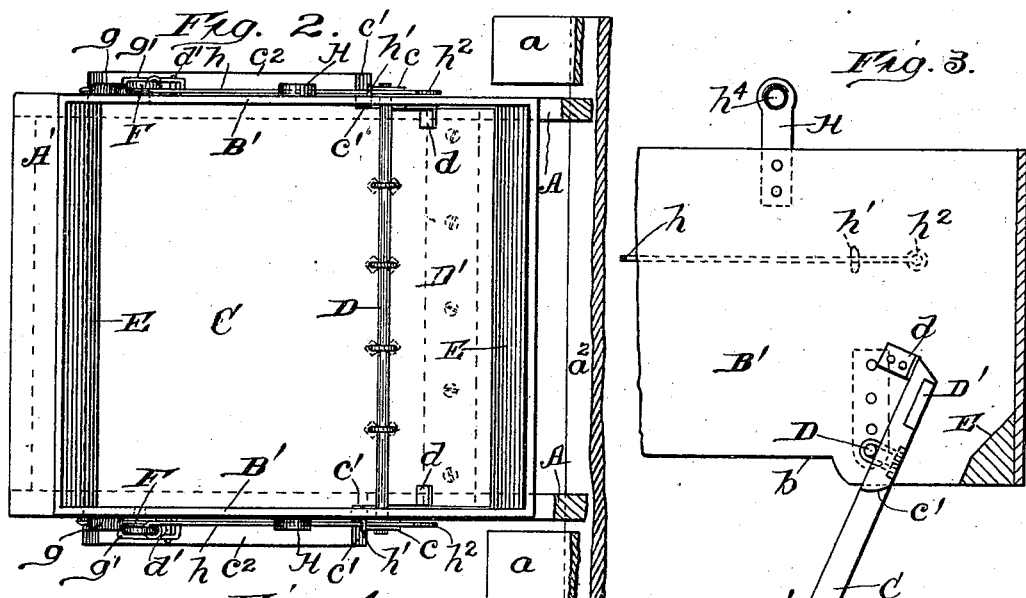
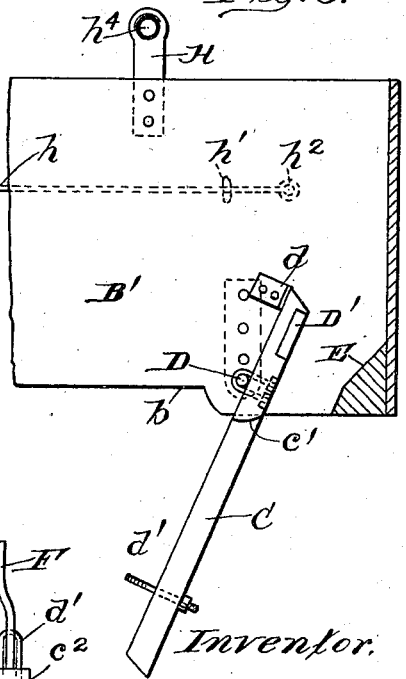
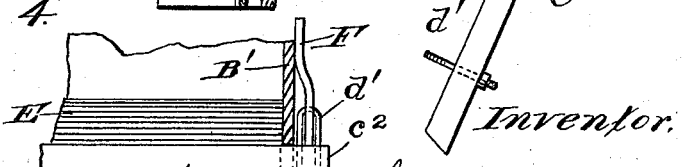
Witnesses:
Chas. E. Gorton
A. Gustafson
Inventor:
Charles Campbell
By Chas. C. Gillman, Atty.

UNITED STATES PATENT OFFICE.

CHARLES CAMPBELL, OF GRANTPARK, ILLINOIS.

UNLOADING APPARATUS.

SPECIFICATION forming part of Letters Patent No. 725,406, dated April 14, 1903.

Application filed December 19, 1902. Serial No. 135,897. (No model.)

*To all whom it may concern:*

Be it known that I, CHARLES CAMPBELL, a citizen of the United States, residing at Grantpark, in the county of Kankakee and State of Illinois, have invented certain new and useful Improvements in an Unloading Apparatus, of which the following is a specification.

This invention relates to improvements in an unloading apparatus, and while it is more especially intended to be used in connection with wagons for hauling or transporting corn and other grain from the field to the granary and then hoisting and unloading it, yet it is applicable for use in hoisting and conveying from one point to another, and finally discharging or unloading it, various kinds of material, such as all sorts of field products, sand, gravel, coal, potatoes, fruit, and the like; and it consists in certain peculiarities of the construction, novel arrangement, and operation of the various parts thereof, as will be hereinafter more fully set forth and specifically claimed.

As is well known, the receiving-bins of granaries, warehouses, and cribs are generally elevated to a considerable extent, and as the material must be placed in them at their tops it is apparent that unloading from the wagon to the bins is quite a difficult task and has heretofore been attended with much loss of grain, besides requiring much time and labor.

It is therefore the principal object of my invention to provide an unloading apparatus of the above-described character which shall be simple and inexpensive in construction, strong, durable, and so made that the operation of hoisting and unloading may be easily, satisfactorily, and quickly performed.

Another object of the invention is to so construct the apparatus by using a number of receptacles that the load will be divided, thus rendering it more easily handled and at the same time affording means for keeping different kinds of grain or material separate.

A further object is to provide each of the receptacles with an automatically closing and fastening door or bottom. Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a view in side elevation showing an unloading apparatus embodying my invention and illustrating by continuous lines the parts in position ready for use and by dotted lines one of the receptacles in the act of being hoisted. Fig. 2 is an enlarged top plan view of one of the boxes or receptacles, showing it in position on a part of the supporting-frame. Fig. 3 is an enlarged sectional view of a portion of one of the boxes or receptacles, showing the bottom or door thereof depressed to the position it will occupy when the contents of the box are discharged or emptied; and Fig. 4 is a fragmental view of the lower portion of one of the boxes or receptacles, showing the door or bottom fastened in position.

Similar letters of reference refer to like parts throughout the different views of the drawings.

A represents the side rails of the supporting-frame, which is preferably rectangular in shape and of a size to fit and rest between the standards of the front and rear trucks of a wagon. (Not shown.) The ends of the side rails A are united by cross-pieces A', which, as shown in Fig. 1 of the drawings, project above the upper surface of the rails A, and thus afford means to prevent the movement longitudinally thereon of the boxes B or receptacles, three of which I prefer to use. Each of the side rails A is provided at about its middle with a standing board $a$ and is usually braced by means of a brace bar or rod $a'$ and cross-pieces $a^2$, as is clearly shown in Fig. 1 of the drawings.

Each of the boxes or receptacles B is made of any suitable size, form, and material, but preferably of wood and rectangular in shape, as shown. The top and bottom of each of the boxes B is open, and the lower portion of the sides B' of each of the boxes is provided with a recess $b$ to receive a portion of the bottom or door C, which is pivotally secured on a rod D, extending from one side to the other of the box and secured at its ends in metal plates or straps $c$, bolted or otherwise secured to said sides. Each of the lower ends of the boxes is provided with inwardly-inclined pieces E, which extend from one side of the box to the other and is used for the purpose of guiding the grain or other material therefrom, as well as for strengthening the box or receptacle.

As is clearly shown in Figs. 2 to 4, inclusive, of the drawings, the door or bottom C is so made that its upper portion when in its deflected position will operate between the sides B' of the box and when in its horizontal or closed position the side edges thereof will rest in the recesses $b$ of the sides B', so that it will be flush with the lower surface of the box. In other words, the upper portion of the door when deflected is reduced or cut away, as at $c'$, on each of its sides, while its lower portion is provided with lateral extensions $c^2$ to rest against the lower edges of the sides of the box and to project laterally therefrom. To prevent the door turning too far, I secure to the inner surface of each of the sides B' a piece $d$, against which the upper end of the door will impinge and which act as stops or checks therefor. The upper or shorter portion of the door or bottom C is provided with a weight D' to counterbalance the other portion of the door, so as to cause it to automatically close after the box shall have been emptied. Each side of the door is provided near its front or lower end with a catch $d'$ to engage the levers F, one of which is fulcrumed to each of the sides of the box and has its lower end formed with a beveled projection $f$ to engage the catch $d'$ on the door or bottom. Secured at one of its ends to each of the sides B' of the box is a spring $g$, the other end of which is attached to the upper portion of the lever F and is used to cause the projection $f$ on said lever to engage its catch. Each of these levers is held in place and its movement regulated by means of a guide-piece $g'$, secured to the side of the box. Connected to the upper end of each of the levers F is a rod $h$, which passes through a guide-piece $h'$ and has in its free end an eye $h^2$, to which may be attached a tripping rope or cord $h^3$, used for releasing the levers F from their catches, so as to allow the bottom or door to be dropped. The upper portion of each of the sides B' is provided at about its middle with a strap H, having in its upper end an opening $h^4$, in which may be secured a cord or chain to which the lifting device G, such as a hay-lifter or the like, may be connected for hoisting the box or receptacle from the supporting-frame.

From the foregoing and by reference to the drawings it will be seen and clearly understood that by placing three of the boxes or receptacles on the supporting-frame, as shown in Fig. 1 of the drawings, the end receptacles will be prevented from longitudinal movement by means of the cross-pieces A' of the frame, and, as before stated, they will be held against lateral movement by the standards of the wagon. The middle box will be prevented from excessive movement in either direction by means of the end boxes, as is apparent. After the boxes have been filled by allowing the grain to run therein from the threshing-machine or otherwise they may be conveyed on the wagon to the granary, where they may be hoisted by means of any suitable hoisting device and swung over the bin, when by pulling on the tripping-rope $h^3$ the levers F will be disengaged from the catches $d'$ on the door or bottom, thus releasing it and allowing it to assume the position shown in Fig. 3 of the drawings, at which time the grain or other material will be discharged from the box or receptacle. As soon as the box has been emptied the door C will be caused to assume a horizontal or closed position by reason of the counterbalancing-weight D', which is located, as before stated, on its shorter portion. As the door rises to a horizontal position the catches $d'$ will strike the beveled or inclined surfaces of the projections $f$ on the levers F and force them outwardly from said catches until the catches have passed beyond the ends of the projections, when the springs $g$ will retract the levers F, and thus cause the projections to automatically engage the catches and fasten the door in position.

Having thus fully described my invention, what I claim as new, and desire to secure by Letters Patent, is—

1. In an unloading apparatus, the combination with the supporting-frame having upward projections at its ends, with a series of boxes resting on said frame, the end boxes resting against the inner surface of said projections to prevent their longitudinal movement thereon, each of said boxes having its lower side edges recessed, and provided with means to engage a hoisting device, a counterweighted door pivotally secured between the sides of each of the boxes at their lower portions, said door having a reduced portion to extend between the box sides, and a widened portion to rest in the said recesses of the sides, and to project beyond the same, and means to automatically fasten each of the doors, when closed, substantially as described.

2. In an unloading apparatus, the combination with a box, of a counterweighted door pivotally secured between its sides at the lower portion thereof and having a catch at each of its sides, a spring-actuated lever fulcrumed to each side of the box and having at their lower ends beveled projections to engage said catches, means connected to the upper ends of the levers to trip the same, and means on the upper portion of the box to engage a hoisting device, substantially as described.

3. In an unloading apparatus, the combination with a box having its lower side edges recessed, of a counterweighted door pivotally secured between the sides of the box at their lower portions, said door having a reduced portion to extend between the box sides and a widened portion to rest in the said recesses of the sides and to project beyond the same, a catch secured to each side of the door, a spring-actuated lever fulcrumed to each side of the box and provided with beveled projections at their lower ends to engage said catches, means connected to the upper ends of said levers to trip them, and means on the upper end of the box to engage a hoisting device, substantially as described.

CHARLES CAMPBELL.

Witnesses:
L. C. STREETER,
T. J. WHEELER.